(12) United States Patent
Kim et al.

(10) Patent No.: US 10,535,884 B2
(45) Date of Patent: Jan. 14, 2020

(54) AIR PROCESSING SYSTEM OF FUEL CELL VEHICLE MOUNTED WITH INTEGRATED VALVE

(71) Applicant: Hyundai Motor Company, Seoul (KR)

(72) Inventors: Duck Whan Kim, Seongnam-si (KR); Chang Ha Lee, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 629 days.

(21) Appl. No.: 14/728,694

(22) Filed: Jun. 2, 2015

(65) Prior Publication Data

US 2016/0141661 A1 May 19, 2016

(30) Foreign Application Priority Data

Nov. 13, 2014 (KR) .................. 10-2014-0157924

(51) Int. Cl.
*H01M 8/04082* (2016.01)
*H01M 8/04089* (2016.01)

(52) U.S. Cl.
CPC ... *H01M 8/04201* (2013.01); *H01M 8/04089* (2013.01); *H01M 2250/20* (2013.01); *Y02T 90/32* (2013.01)

(58) Field of Classification Search
CPC ............ H01M 8/04089–8/04104; H01M 8/2483–8/2484; H01M 8/04746–8/04761; H01M 8/04791–8/04805; H01M 8/04828–8/04843; H01M 8/04082; H01M 8/04119; H01M 8/04197; H01M 8/04201; H01M 8/2465; H01M 8/04223; H01M 8/04225; H01M 8/04228; H01M 8/04231; H01M 8/0438; H01M 8/04388; H01M 8/04395; H01M 8/04753; H01M 8/04126; F16K 31/04–31/048
See application file for complete search history.

(56) References Cited

U.S. PATENT DOCUMENTS

| 6,541,141 | B1 * | 4/2003 | Frank | ...................... | H01M 8/04 429/414 |
| 8,986,901 | B2 | 3/2015 | Katano | | |
| 2003/0138684 | A1 * | 7/2003 | Tinker | ..................... | H01M 2/10 429/403 |
| 2004/0151975 | A1 * | 8/2004 | Allen | ..................... | B21D 13/02 29/623.1 |

(Continued)

FOREIGN PATENT DOCUMENTS

JP 5299556 B2 9/2013
KR 10-2010-0136716 A 12/2010

*Primary Examiner* — Eric R Smith (57) ABSTRACT

An air processing system of a fuel cell vehicle mounted with an integrated valve includes: the integrated valve attached to an air inlet and an air outlet formed integrally with a fuel cell stack and adjusting amounts of air introduced into and discharged from the fuel cell stack. The integrated valve is positioned at the shortest distance from the fuel cell stack, such that an amount of remaining oxygen that is to be consumed at the time of stopping start of a fuel cell vehicle is minimized. Therefore, corrosion of cathode carbon is decreased as compared with the related art, such that durability of the fuel cell vehicle is improved.

18 Claims, 7 Drawing Sheets

(56) References Cited

U.S. PATENT DOCUMENTS

| | | | |
|---|---|---|---|
| 2006/0086392 A1* | 4/2006 | Nakayama | F02D 9/109 |
| | | | 137/595 |
| 2007/0053237 A1* | 3/2007 | Yoshida | B01F 3/02 |
| | | | 366/165.1 |
| 2008/0096070 A1* | 4/2008 | Lee | H01M 8/04089 |
| | | | 429/414 |
| 2010/0323259 A1 | 12/2010 | Sung et al. | |
| 2012/0181098 A1* | 7/2012 | Masaki | B60K 11/02 |
| | | | 180/65.31 |
| 2014/0120444 A1* | 5/2014 | Zhang | H01M 8/04992 |
| | | | 429/444 |
| 2014/0212780 A1* | 7/2014 | Furusawa | H01M 8/04955 |
| | | | 429/429 |

* cited by examiner

AIR PROCESSING SYSTEM OF FUEL CELL VEHICLE MOUNTED WITH INTEGRATED VALVE

CROSS-REFERENCE TO RELATED APPLICATION

This application is based on and claims the benefit of priority to Korean Patent Application No. 10-2014-0157924, filed on Nov. 13, 2014 in the Korean Intellectual Property Office, the disclosure of which is incorporated herein in its entirety by reference.

TECHNICAL FIELD

The present disclosure relates to an air processing system of a fuel cell vehicle mounted with an integrated valve, and more particularly, to an air processing system of a fuel cell vehicle mounted with an integrated valve capable of improving durability of a fuel cell stack.

BACKGROUND

A polymer electrolyte membrane fuel cell provided in a fuel cell vehicle necessarily requires moisture in order to be operated. Since the moisture serves as a transfer medium of hydrogen ions in a fuel cell, humidity of air supplied to a fuel cell stack is associated directly with performance of the fuel cell.

Figure 1:
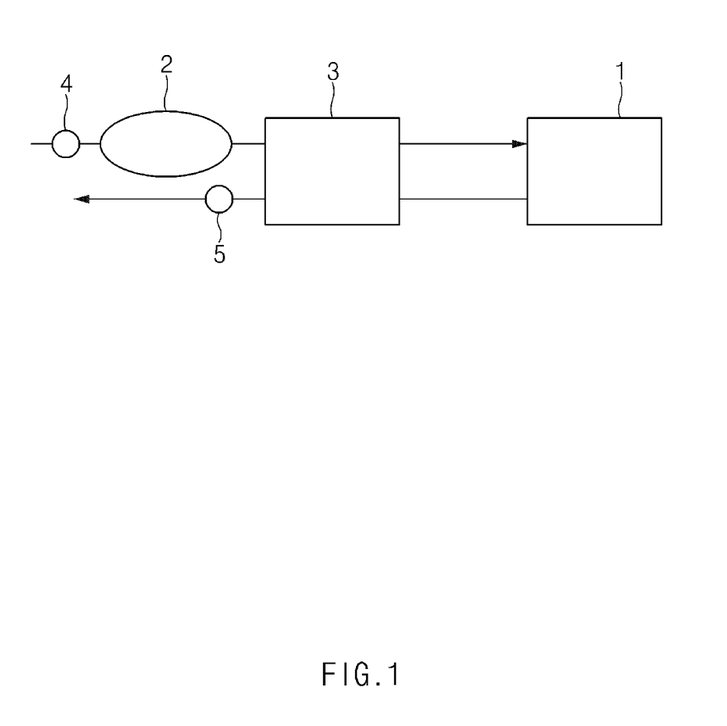
FIG. 1 is a schematic view of a system for supplying air to a fuel cell stack according to the related art.

Therefore, the fuel cell vehicle has been provided with an air processing system according to the related art, as illustrated in FIG. 1. The air supplied to the fuel cell stack 1 is taken in through a blower 2 provided in an intake pipe, is injected into a humidifier 3, is humidified through the humidifier 3, and is then introduced into the fuel cell stack 1, as illustrated in FIG. 1. The air supplied to the fuel cell stack 1 again passes through the humidifier 3 and is then discharged to the outside through an exhaust pipe.

Meanwhile, in order to control amounts of air introduced into the fuel cell stack 1 and air discharged from the fuel cell stack 1, the intake pipe and the exhaust pipe are provided with air cut valves 4 and 5. After a start of the fuel cell vehicle is stopped, the air cut valves 4 and 5 provided in the intake pipe and the exhaust pipe are closed, and oxygen in the air introduced into the fuel cell stack are consumed to prevent corrosion of cathode carbon provided in the fuel cell.

However, according to the related art, the air cut valves 4 and 5 are positioned at a distance distant from the fuel cell stack, such that a large amount of oxygen is consumed after the start of the fuel cell vehicle is stopped. Therefore, it is difficult to completely prevent the corrosion of the cathode carbon.

RELATED ART DOCUMENT

Patent Document (Patent Document 1) Korean Patent Publication No. 10-1230891 (published on Feb. 7, 2013)

SUMMARY

The present disclosure has been made to solve the above-mentioned problems occurring in the prior art while advantages achieved by the prior art are maintained intact.

An aspect of the present disclosure provides an air processing system of a fuel cell vehicle mounted with an integrated valve capable of improving durability of a fuel cell stack by positioning a valve cutting humidified air introduced into the fuel cell stack at the shortest distance from the fuel cell stack.

According to an exemplary embodiment of the present disclosure, an air processing system of a fuel cell vehicle mounted with an integrated valve includes: the integrated valve attached to an air inlet and an air outlet formed integrally with a fuel cell stack and adjusting amounts of air introduced into and discharged from the fuel cell stack.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

As illustrated in FIGS. 2 to 6, an air processing system of a fuel cell vehicle mounted with an integrated valve according to a first exemplary embodiment of the present disclosure includes an integrated valve 200 attached to an air inlet 110 and an air outlet 120 formed integrally with a fuel cell stack 100 and adjusting amounts of air introduced into and discharged from the fuel cell stack 100.

Figure 2:
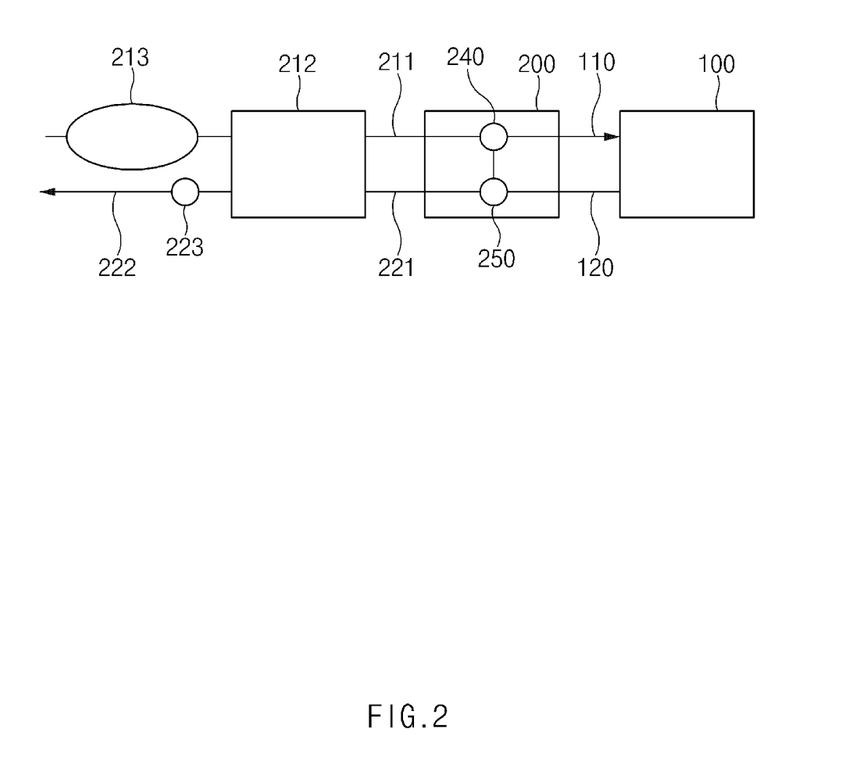
FIG. 2 is a schematic view of an air processing system of a fuel cell vehicle mounted with an integrated valve according to a first exemplary embodiment of the present disclosure.
Figure 3:
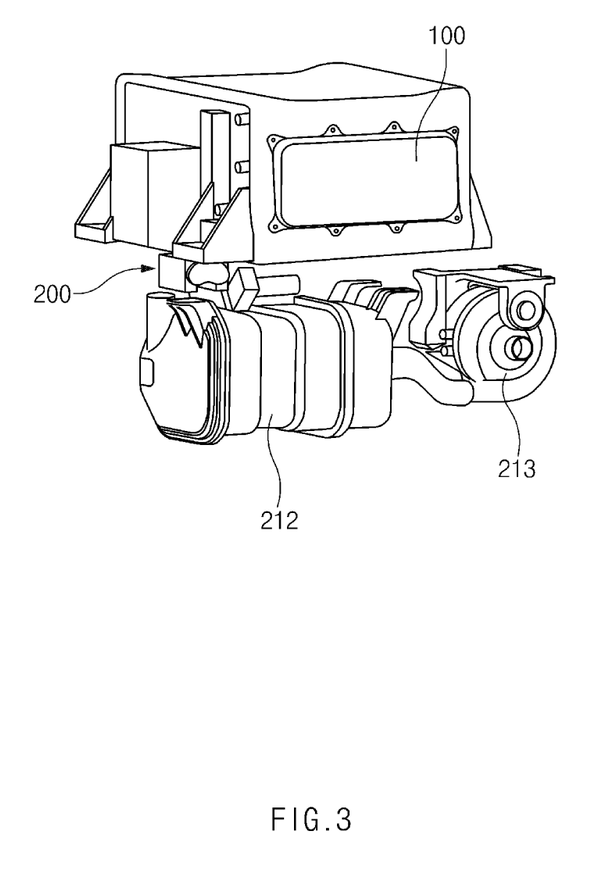
FIG. 3 is a perspective view of the air processing system of a fuel cell vehicle mounted with an integrated valve of FIG. 2.
Figure 4:
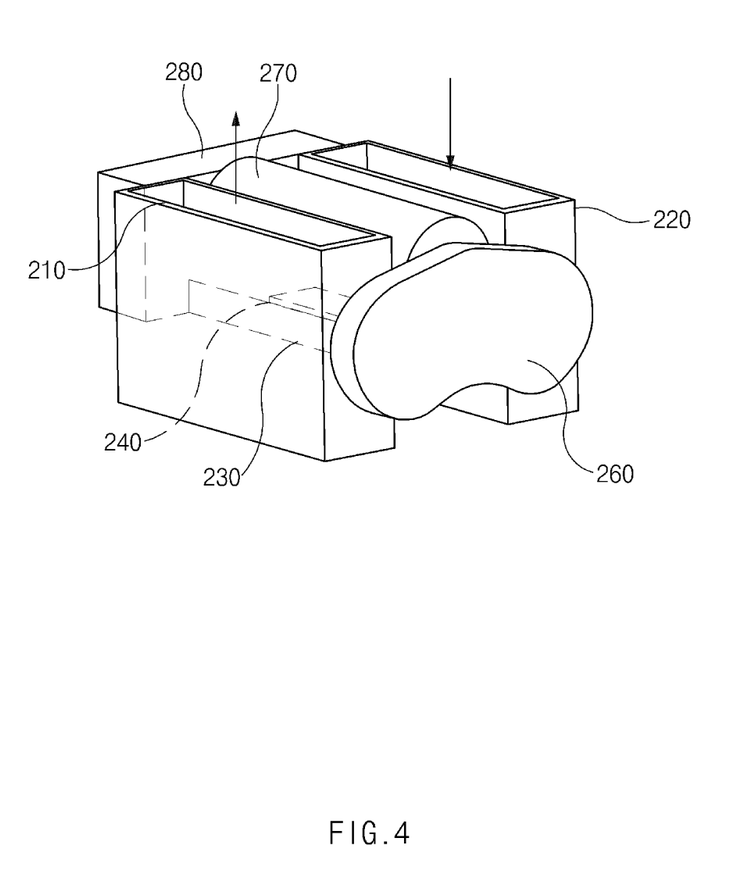
FIG. 4 is a perspective view of an integrated valve provided in the air processing system of a fuel cell vehicle mounted with an integrated valve of FIG. 2.

The integrated valve 200 includes an inlet channel 210 connected to the air inlet 110, an outlet channel 220 connected to the air outlet 120, and a bypass channel 230 connecting the inlet channel 210 and the outlet channel 220 to each other. In addition, the integrated valve 200 includes an inlet valve plate 240, which is a movable member, provided in the inlet channel 210 and an outlet valve plate 250, which is a movable member, provided in the outlet channel 220, preferably, at an intersection of the outlet channel 220 and the bypass channel 230, and further includes a gear box 260 connected to the inlet valve plate 240 and the outlet valve plate 250, a motor 270 connected to the gear box 260, and a controller 280 controlling an operation and a revolution per minute (RPM) of the motor 270.

The inlet valve plate 240 and the outlet valve plate 250 rotate at the same angle. The bypass channel 230 is opened or closed depending on rotation of the outlet valve plate 250.

The inlet channel 210 includes an introduction pipe 211 extended from the inlet channel 210 to the outside and inducing air present at the outside into the fuel cell stack 100, a humidifier 212 mounted in the introduction pipe 211 and allowing moisture to be contained in the air, and a compressor 213 taking in the air from the outside and mounted in the introduction pipe 211 so as to compress the taken-in air and inject the compressed air into the humidifier 212.

The outlet channel 220 includes an inner discharge pipe 221 extended from the outlet channel 220 to the humidifier 212 and an outer discharge pipe 222 extended from the humidifier 212 to the outside. The outlet channel 220 further includes a pressure adjusting valve 223 adjusting a pressure of air discharged from the humidifier 212 to the outside, blocking introduction of external air at the time of stop, and mounted in the outer discharge pipe 222.

Figure 5A:
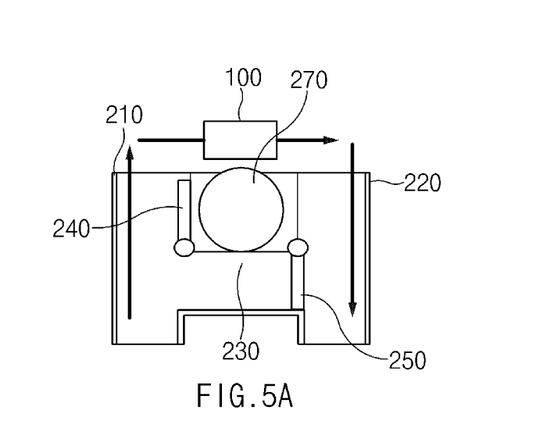
FIGS. 5A to 5C are illustrative views of an operation of the integrated valve provided in the air processing system of a fuel cell vehicle mounted with an integrated valve of FIG. 2.
Figure 5B:
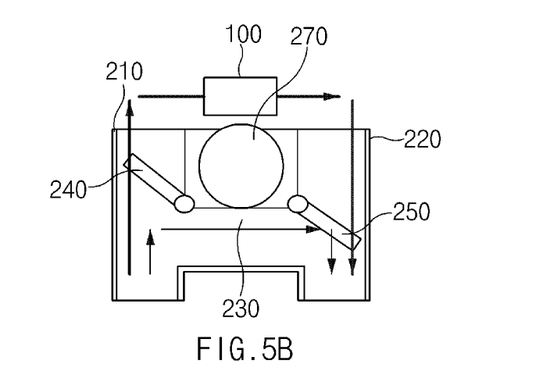
Figure 5C:
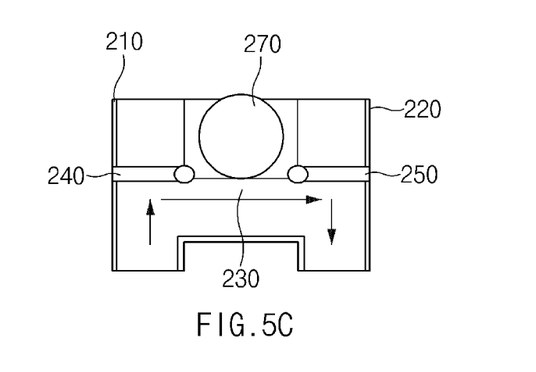
Figure 6:
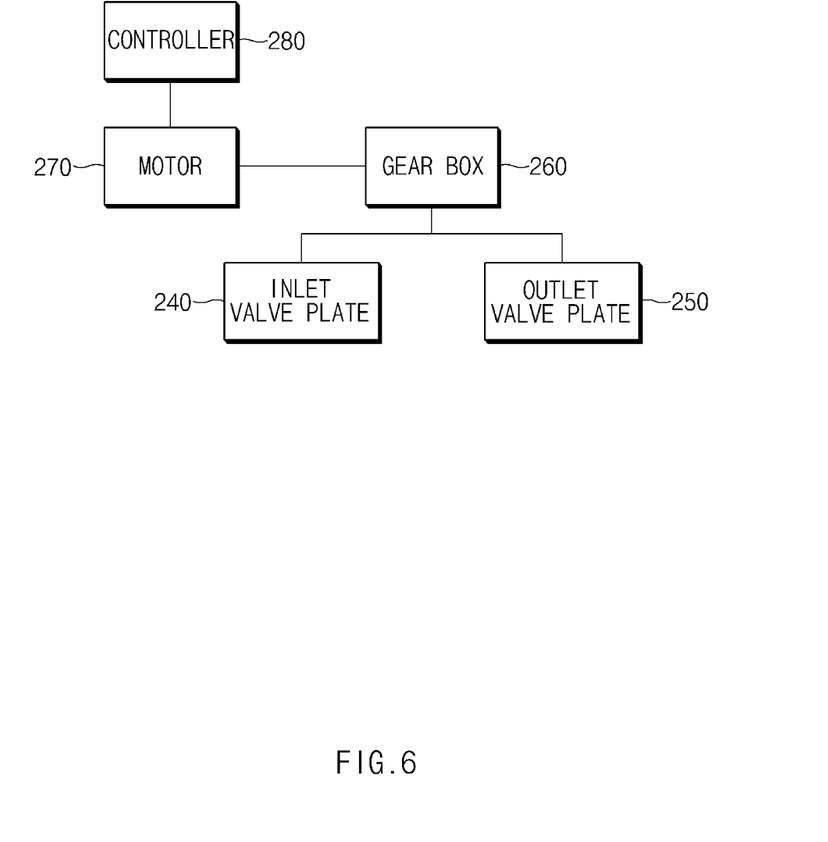
FIG. 6 is a control block diagram of a controller provided in the air processing system of a fuel cell vehicle mounted with an integrated valve of FIG. 2.

FIGS. 5A to 5C are illustrative views of an operation of the integrated valve 200 provided in the air processing system of a fuel cell vehicle mounted with an integrated valve of FIG. 2.

FIG. 5A, which is an illustrative view of a normal driving state according to the first exemplary embodiment, illustrates a state in which the inlet valve plate 240 and the outlet valve plate 250 completely open the air inlet 110 and the air outlet 120. All the air introduced into the inlet channel 210 is introduced into the fuel cell stack 100 and is discharged to the outside through the outlet channel 220.

The bypass channel 230 is closed by the outlet valve plate 250, and all the air introduced into the inlet channel 210 is discharged to the outlet channel 220 via the fuel cell stack 100. Here, it is preferable that the bypass channel 230 is formed so that a cross-sectional area thereof is the same as or smaller than that of the outlet channel 220 so that the outlet valve plate 250 completely closes the bypass channel 230.

FIG. 5B, which is an illustrative view of a special driving state according to the first exemplary embodiment, illustrates a state in which the inlet valve plate 240 and the outlet valve plate 250 partially open the air inlet 110 and the air outlet 120. Some of the air introduced into the inlet channel 210 is introduced into the fuel cell stack 100, and the other thereof is not introduced into the fuel cell stack 100, but is discharged to the outside through the bypass channel 230 and the outlet channel 220, depending on a pressure difference between an inner portion of the fuel cell stack 100 and the inlet channel 210.

In the case of a cold start in which the fuel cell vehicle is started in a state in which a temperature of the fuel cell stack 100 is an appropriate temperature or less, a flow rate supplied to the fuel cell stack 100 is minimized to allow the fuel cell stack 100 to be operated in an abnormal state, thereby causing self heating of the fuel cell stack. At the same time, in order to increase generation of electricity of the fuel cell stack 100, a micro controller unit (MCU), a driving motor, the compressor (blower) 213, and the like, are operated to consume the electricity.

Here, as illustrated in FIG. 5B, when the inlet valve plate 240 opens only a portion of the air inlet 110 and the compressor 213 is operated at a maximum output (8 to 10 kW), a required amount of air is supplied to the fuel cell stack 100, and the self heating of the fuel cell stack is induced, such that a cold start feature is improved.

FIG. 5C, which is an illustrative view of a start-off state according to the first exemplary embodiment, illustrates a state in which the inlet valve plate 240 and the outlet valve plate 250 completely close the air inlet 110 and the air outlet 120. All the air introduced into the inlet channel 210 is introduced to the outlet channel 220 through the bypass channel 230 and is then discharged to the outside.

In this case, oxygen included in the air introduced into the fuel cell stack 100 is rapidly consumed, such that all the oxygen remaining in the fuel cell stack 100 disappears. Therefore, corrosion of cathode carbon is prevented, such that durability of the fuel cell stack 100 is improved and durability of the fuel cell vehicle is ultimately improved.

In addition, in a state in which charging of a high voltage battery is completed and the fuel cell vehicle is driven on a downhill road, since regenerative braking is impossible, a brake is forcibly operated, the inlet valve plate 240 is operated as illustrated in FIG. 5B or 5C, and when the compressor 213 is operated at the maximum output, the completely charged battery is discharged, such that auxiliary braking through the regenerative braking is generated.

In the first exemplary embodiment of the present disclosure configured as described above, two valve plates are operated through one motor 270, such that the integrated valve may be designed so as to have a compact layout and may be mounted directly on the fuel cell stack 100. Therefore, an amount of remaining oxygen that is to be consumed at the time of stopping the start is decreased as compared with the related art.

Meanwhile, when the motors 270 operating the inlet valve plate 240 and the outlet valve plate 250 are individually provided, a function of the pressure adjusting valve 223 may be performed through the integrated valve 200. A second exemplary embodiment of the present disclosure, which is a configuration in which the function of the pressure adjusting valve 223 is performed through the integrated valve 200, will be described below in more detail.

Figure 7:
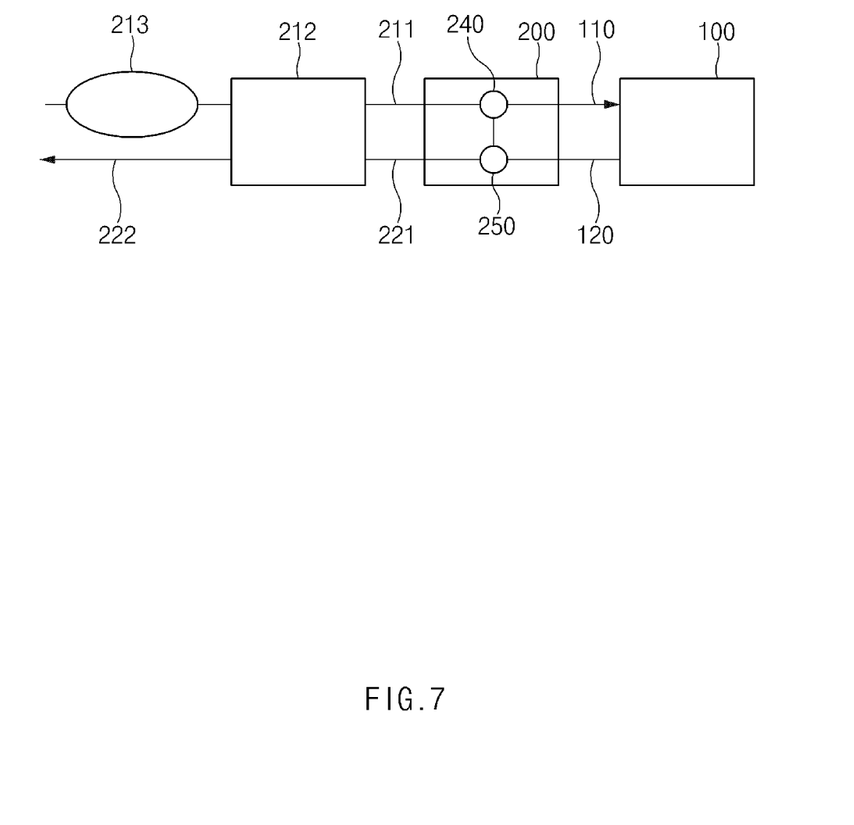
FIG. 7 is a schematic view of an air processing system of a fuel cell vehicle mounted with an integrated valve according to a second exemplary embodiment of the present disclosure.

As illustrated in FIG. 7, an air processing system of a fuel cell vehicle mounted with an integrated valve according to a second exemplary embodiment of the present disclosure includes an integrated valve 200 attached to an air inlet 110 and an air outlet 120 formed integrally with a fuel cell stack 100, wherein the integrated valve 220 includes: an inlet valve plate 240 provided in the integrated valve 200 so as to adjust an amount of air introduced into the air inlet 110, an outlet valve plate 250 provided in the integrated valve 200 so as to adjust an amount of air discharged to the air outlet 120, and a bypass channel 230 bypassing the air introduced into the air inlet 110 to the air outlet 120. The outlet valve plate 250 serves as the pressure adjusting valve 223 according to the first exemplary embodiment of the present disclosure.

The integrated valve 200 includes a motor 270 connected to the inlet valve plate 240, a motor 270 connected to the outlet valve plate 250, and a controller 280 controlling operations and RPMs of the respective motors 270, and the inlet valve plate 240 and the outlet valve plate 250 rotate at different angles.

As described above, in the air processing system of a fuel cell vehicle mounted with an integrated valve according to the exemplary embodiment of the present disclosure, the integrated valve is positioned at the shortest distance from the fuel cell stack, such that an amount of remaining oxygen that is to be consumed at the time of stopping the start of the fuel cell vehicle is minimized. Therefore, the corrosion of the cathode carbon is decreased as compared with the related art, such that the durability of the fuel cell vehicle is improved.

In addition, functions of cut valves each mounted in an intake pipe and an exhaust pipe in the related art may be performed by the integrated valve, and a function of a bypass valve bypassing the air introduced from the intake pipe to the fuel cell stack to the exhaust pipe may be performed by the integrated valve. Therefore, the air processing system of a fuel cell vehicle mounted with an integrated valve has a configuration simpler as compared with the related art, is advantageous for a package, and is manufactured at a decreased cost.

In addition, since a bypass function is easily implemented using the integrated valve, an amount of air introduced into the fuel cell stack may be controlled, and a control logic of the fuel cell vehicle that may not be implemented in the related art may be developed.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An air processing system of a fuel cell vehicle mounted with an integrated valve, comprising:
    the integrated valve attached to an air inlet and an air outlet formed integrally with a fuel cell stack and adjusting amounts of air introduced into and discharged from the fuel cell stack, wherein the integrated valve includes:
    an inlet channel connected to the air inlet;
    an outlet channel connected to the air outlet;
    a bypass channel connecting the inlet channel and the outlet channel to each other;
    a first rotary member positioned at an intersection of the inlet channel and the bypass channel;
    a second rotary member positioned at an intersection of the outlet channel and the bypass channel;
    a gear box connected to the first rotary member and the second rotary member;
    a motor connected to the gear box; and
    a controller controlling an operation and a revolution per minute (RPM) of the motor,
    wherein the motor drives the first rotary member to rotate around a first rotation axis and the second rotary member to rotate around a second rotation axis different from the first rotation axis, and
    wherein the first rotary member and the second rotary member are movable, under a first operation of the first rotary member and the second rotary member by the motor, to close a flow path from the inlet channel to the air inlet and a flow path from the air outlet to the outlet channel and to simultaneously open a flow path from the inlet channel to the outlet channel via the bypass channel, and the first rotary member and the second rotary member are coplanar to each other and parallel to the bypass channel after the first operation, and
    wherein the first rotary member and the second rotary member are movable, under a second operation of the first rotary member and the second rotary member by the motor, to open the flow path from the inlet channel to the air inlet and the flow path from the air outlet to the outlet channel and to simultaneously close the bypass channel, and the first rotary member and the second rotary member are parallel to each other and perpendicular to the bypass channel after the second operation.

2. The air processing system of a fuel cell vehicle mounted with an integrated valve according to claim 1, wherein the first rotary member and the second rotary member rotate at the same angle.

3. The air processing system of a fuel cell vehicle mounted with an integrated valve according to claim 1, wherein the bypass channel is opened or closed depending on rotation of the second rotary member.

4. The air processing system of a fuel cell vehicle mounted with an integrated valve according to claim 1, wherein the inlet channel includes:
    an introduction pipe extended from the inlet channel to the outside and inducing air present at the outside into the fuel cell stack;
    a humidifier mounted in the introduction pipe and allowing moisture to be contained in the air; and
    a compressor taking in the air from the outside and mounted in the introduction pipe so as to compress the taken-in air and inject the compressed air into the humidifier.

5. The air processing system of a fuel cell vehicle mounted with an integrated valve according to claim 4, wherein the outlet channel includes:
    an inner discharge pipe extended from the outlet channel to the humidifier; and
    an outer discharge pipe extended from the humidifier to the outside.

6. The air processing system of a fuel cell vehicle mounted with an integrated valve according to claim 5, wherein the outlet channel further includes a pressure adjusting valve mounted in the outer discharge pipe so as to adjust a pressure of air discharged from the humidifier to the outside.

7. The air processing system of a fuel cell vehicle mounted with an integrated valve according to claim 1, wherein the inlet channel and the outlet channel are parallel to each other, and the bypass channel is perpendicular to the inlet channel and the outlet channel.

8. An air processing system of a fuel cell vehicle mounted with an integrated valve, comprising:
    the integrated valve attached to an air inlet and an air outlet formed integrally with a fuel cell stack, wherein the integrated valve includes:
    an inlet channel connected to the air inlet;
    an outlet channel connected to the air outlet;
    a bypass channel connecting the inlet channel and the outlet channel to each other;
    a first rotary member positioned at an intersection of the inlet channel and the bypass channel so as to adjust an amount of air introduced into the air inlet;
    a second rotary member positioned at an intersection of the outlet channel and the bypass channel so as to adjust an amount of air discharged to the air outlet,
    wherein the first rotary member and the second rotary member are movable, under a first operation of the first rotary member and the second rotary member, to close a flow path from the inlet channel to the air inlet and a flow path from the air outlet to the outlet channel and to simultaneously open a flow path from the inlet channel to the outlet channel via the bypass channel, and the first rotary member and the second rotary member are coplanar to each other and parallel to the bypass channel after the first operation, and wherein the first rotary member and the second rotary member are movable, under a second operation of the first rotary member and the second rotary member, to open the flow path from the inlet channel to the air inlet and the flow path from the air outlet to the outlet channel and to simultaneously close the bypass channel, and the first rotary member and the second rotary member are parallel to each other and perpendicular to the bypass channel after the second operation.

9. The air processing system of a fuel cell vehicle mounted with an integrated valve according to claim 8, wherein the inlet channel and the outlet channel are parallel to each other, and the bypass channel is perpendicular to the inlet channel and the outlet channel.

10. An air processing system of a fuel cell vehicle, comprising:
    a fuel cell stack; and
    an integrated valve mounted to the fuel cell stack, and including:
        an inlet channel and an outlet channel connected to the fuel cell stack;
        a bypass channel coupled between the inlet channel and the outlet channel;
        a first rotary member positioned at an intersection of the inlet channel and the bypass channel, and movable between a first position in which an air path from the bypass channel to the fuel cell stack via a portion of the inlet channel is open and a second position in which the air path from the bypass channel to the fuel cell stack via the portion of the inlet channel is closed; and
        a second rotary member positioned at an intersection of the outlet channel and the bypass channel, and movable between a third position in which an air path directly from the bypass channel to a portion of the outlet channel is closed and a fourth position in which the air path directly from the bypass channel to the portion of the outlet channel is open,
        wherein the first rotary member and the second rotary member are movable, under a first operation of the first rotary member and the second rotary member, to close a flow path from the inlet channel to an air inlet and a flow path from an air outlet to the outlet channel and to simultaneously open a flow path from the inlet channel to the outlet channel via the bypass channel, and the first rotary member and the second rotary member are coplanar to each other and parallel to the bypass channel after the first operation, and
        wherein the first rotary member and the second rotary member are movable, under a second operation of the first rotary member and the second rotary member, to open the flow path from the inlet channel to the air inlet and the flow path from the air outlet to the outlet channel and to simultaneously close the bypass channel, and the first rotary member and the second rotary member are parallel to each other and perpendicular to the bypass channel after the second operation.

11. The air processing system of a fuel cell vehicle according to claim 10, further comprising a humidifier, wherein the inlet channel of the integrated valve is disposed between the humidifier and the fuel cell stack.

12. The air processing system of a fuel cell vehicle according to claim 10, further comprising a pressure adjusting valve, wherein the outlet channel of the integrated valve is disposed between the pressure adjusting valve and the fuel cell stack.

13. The air processing system of a fuel cell vehicle according to claim 10, wherein the integrated valve further includes:
    a motor simultaneously controlling the movement of the first rotary member and the movement of the second rotary member;
    a gear box connected to the first rotary member and the second rotary member; and
    a controller controlling an operation and a revolution per minute (RPM) of the motor.

14. The air processing system of a fuel cell vehicle according to claim 13, wherein the motor drives the first rotary member to rotate around a first rotation axis and the second rotary member to rotate around a second rotation axis different from the first rotation axis.

15. The air processing system of a fuel cell vehicle according to claim 10, wherein the inlet channel and the outlet channel are parallel to each other, and the bypass channel is perpendicular to the inlet channel and the outlet channel.

16. An air processsing system of a fuel cell vehicle mounted with an integrated valve, comprising:
    the integrated valve attached to an air inlet and an air outlet formed integrally with a fuel cell stack and adjusting amounts of air introduced into and discharged from the fuel cell stack, wherein the integrated valve includes:
        an inlet channel connected to the air inlet;
        an outlet channel connected to the air outlet;
        a bypass channel connecting the inlet channel and the outlet channel to each other;
        a first rotary member positioned at an intersection of the inlet channel and the bypass channel; and
        a second rotary member positioned at an intersection of the outlet channel and the bypass channel,
        wherein the first rotary member and the second rotary member are movable, under a first operation of the first rotary member and the second rotary member, to close a flow path from the inlet channel to the air inlet and a flow path from the air outlet to the outlet channel and to simultaneously open a flow path from the inlet channel to the outlet channel via the bypass channel, and the first rotary member and the second rotary member are coplanar to each other and parallel to the bypass channel after the first operation, and
        wherein the first rotary member and the second rotary member are movable, under a second operation of the first rotary member and the second rotary member, to open the flow path from the inlet channel to the air inlet and the flow path from the air outlet to the outlet channel and to simultaneously close the bypass channel and the first rotary member and the second rotary member are parallel to each other and perpendicular to the bypass channel after the second operation.

17. The air processing system of a fuel cell vehicle mounted with an integrated valve according to claim 16, further comprising a motor driving the first rotary member to rotate around a first rotation axis and the second rotary member to rotate around a second rotation axis different from the first rotation axis.

18. The air processsing system of a fuel cell vehicle mounted with an integrated valve according to claim 16, the inlet channel and the outlet channel are parallel to each other, and the bypass channel is perpendicular to the inlet channel and the outlet channel.

\* \* \* \* \*